United States Patent
Takahashi et al.

(10) Patent No.: US 10,382,775 B2
(45) Date of Patent: *Aug. 13, 2019

(54) MOVING PICTURE DECODING METHOD AND MOVING PICTURE ENCODING METHOD

(71) Applicant: Maxell, Ltd., Kyoto (JP)

(72) Inventors: Masashi Takahashi, Tachikawa (JP); Muneaki Yamaguchi, Inagi (JP); Hiroaki Ito, Kawasaki (JP); Takehiro Fujita, Hamura (JP)

(73) Assignee: Maxell, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,955

(22) Filed: Jan. 19, 2018

(65) Prior Publication Data
US 2018/0146210 A1 May 24, 2018

Related U.S. Application Data

(63) Continuation of application No. 15/383,421, filed on Dec. 19, 2016, now Pat. No. 9,906,808, which is a
(Continued)

(30) Foreign Application Priority Data

Dec. 3, 2008 (JP) ................................. 2008-308113

(51) Int. Cl.
*H04N 19/00* (2014.01)
*H04N 19/52* (2014.01)
(Continued)

(52) U.S. Cl.
CPC ........... *H04N 19/52* (2014.11); *H04N 19/124* (2014.11); *H04N 19/13* (2014.11); *H04N 19/159* (2014.11);
(Continued)

(58) Field of Classification Search
CPC ........ H04N 19/52; H04N 19/51; H04N 19/44; H04N 19/124; H04N 19/13; H04N 19/159;
(Continued)

(56) References Cited

U.S. PATENT DOCUMENTS 7,272,182 B1* 9/2007 Nakagawa ....... H04N 19/00587
375/240
8,204,124 B2* 6/2012 Okada ................... G06T 3/4007
375/240.16
(Continued)

FOREIGN PATENT DOCUMENTS

JP 2005-124001 A 5/2005
JP 2007-110672 A 4/2007
(Continued)

OTHER PUBLICATIONS

International Search Report dated Mar. 2, 2010 (two (2) pages).
ITU-T Recommendation H. 264, "Inter prediction process", (Nov. 2007), Chapter 8.4 (pp. 143-169).

*Primary Examiner* — Zhihan Zhou
(74) *Attorney, Agent, or Firm* — Crowell & Moring LLP

(57) ABSTRACT

High-quality video is provided using a small amount of coded bits. The moving picture decoding method performs inter-frame prediction processing. With the aforementioned inter-frame prediction processing, blocks with similar motion vectors from among the motion vectors in multiple blocks that have already been decoded are combined and a combined area is computed. A predicted vector for a target block to be decoded is computed using the motion vector of the aforementioned combined area, and a motion vector for the aforementioned target block is computed based on the aforementioned predicted vector and a difference vector which is included in a coded stream that is input. A predicted image is generated using the aforementioned motion vector,
(Continued)

and a difference image which is included in the aforementioned coded stream and the aforementioned predicted image are added to generate a decoded image.

2 Claims, 17 Drawing Sheets

Related U.S. Application Data continuation of application No. 13/132,426, filed as application No. PCT/JP2009/006438 on Nov. 27, 2009, now Pat. No. 9,560,368.

(51) Int. Cl.
| | | |
|---|---|---|
| *H04N 19/51* | (2014.01) | |
| *H04N 19/44* | (2014.01) | |
| *H04N 19/124* | (2014.01) | |
| *H04N 19/13* | (2014.01) | |
| *H04N 19/159* | (2014.01) | |
| *H04N 19/61* | (2014.01) | |
| *H04N 19/172* | (2014.01) | |
| *H04N 19/176* | (2014.01) | |
| *H04N 19/184* | (2014.01) | |

(52) U.S. Cl.
CPC ............ *H04N 19/44* (2014.11); *H04N 19/51* (2014.11); *H04N 19/61* (2014.11); *H04N 19/172* (2014.11); *H04N 19/176* (2014.11); *H04N 19/184* (2014.11)

(58) Field of Classification Search
CPC .... H04N 19/61; H04N 19/172; H04N 19/176; H04N 19/184
See application file for complete search history.

(56) References Cited

U.S. PATENT DOCUMENTS

| | | | | |
|---|---|---|---|---|
| 8,917,768 | B2* | 12/2014 | Srinivasan | H04N 19/51 375/240.1 |
| 2003/0156644 | A1* | 8/2003 | Song | H04N 5/145 375/240.13 |
| 2004/0081238 | A1* | 4/2004 | Parhy | H04N 19/51 375/240.16 |
| 2004/0223548 | A1* | 11/2004 | Kato | H04N 19/172 375/240.16 |
| 2005/0053136 | A1* | 3/2005 | Yu | H04N 19/176 375/240.16 |
| 2006/0233238 | A1* | 10/2006 | Hinds | H04N 19/159 375/240.03 |
| 2007/0064809 | A1 | 3/2007 | Watanabe et al. | |
| 2007/0081588 | A1* | 4/2007 | Raveendran | H04N 5/144 375/240.1 |
| 2007/0110161 | A1* | 5/2007 | Saigo | H04N 19/56 375/240.16 |
| 2008/0123947 | A1* | 5/2008 | Moriya | H04N 19/105 382/166 |
| 2008/0267292 | A1 | 10/2008 | Ito et al. | |
| 2009/0074073 | A1* | 3/2009 | Srinivasan | H04N 19/51 375/240.16 |

FOREIGN PATENT DOCUMENTS

| | | |
|---|---|---|
| JP | 2007-300209 A | 11/2007 |
| JP | 2008-278091 A | 11/2008 |
| JP | 2008-283490 A | 11/2008 |

\* cited by examiner

PREDICTION VECTOR PMV = Median (MVA, MVB, MVC) (605)

DIFFERENCE VECTOR DMV = MV − PMV (605)

$$F'(C) = -\frac{n-m}{m-k} F(C) \quad (908)$$

$$PMV_1 = F(C) = \frac{1}{|C|} \sum_{MV \in C} MV \quad (909)$$

$$PMV_2 = \frac{n-m}{m-k} F(C) \quad (910)$$

$$PMV_3 = AVE(PMV_1, PMV_2) \quad (911)$$

$$\text{Cluster}_1(MV_x) = \sum_{n=1}^{3} |MV_x - MV_{xn}| \quad (1111)$$

$$\text{Cluster}_2(MV_x) = \sum_{n=1}^{3} \frac{MV_x \cdot MV_{xn}}{|MV_x| \cdot |MV_{xn}|} \quad (1112)$$

$$\text{BESTMV} = \underset{MV_x \in MV_A, MV_B, MV_C}{\text{argmin}} \text{Cluster}(MV_x) \quad (1105)$$

$$PMV = \begin{cases} \text{BESTMV (Cluster(BESTMV) IN THE CASE OF} < \text{Threshold2})\\ \text{Median } (MV_A, MV_B, MV_C) \text{ (EXCEPT THE ABOVE)} \end{cases} \quad (1106)$$

MOVING PICTURE DECODING METHOD AND MOVING PICTURE ENCODING METHOD

CROSS REFERENCE TO RELATED APPLICATIONS

This application is a continuation of U.S. application Ser. No. 15/383,421, filed on Dec. 19, 2016, which is a continuation of U.S. application Ser. No. 13/132,426, filed Jun. 23, 2011, which is a National Phase of International Application No. PCT/JP2009/006438, filed Nov. 27, 2009, which claims priority from Japanese Patent Application No. 2008-308113, filed Dec. 3, 2008, the disclosures of which are expressly incorporated by reference herein.

TECHNICAL FIELD

The present invention relates to a moving picture decoding technique for decoding a moving picture, and a moving picture encoding technique for encoding a moving picture.

BACKGROUND ART

There has been disclosed a technique for predicting images to be encoded in block units using image information in which encoding processing has been completed and encoding a predicted difference between each of the images and an original image, thereby reducing the amount of coded bits by removing redundancy of a moving picture. However, the result of a block search is required to be encoded as a motion vector in addition to the predicted difference, and overhead of the amount of coded bits occurs.

H. 264/AVC (Non Patent Literature 1) has disclosed a prediction technique for each motion vector to reduce the amount of coded bits for the motion vector. That is, when a motion vector is encoded, a motion vector of a target block is predicted using each of encoded blocks located around the target block, and a difference (difference vector) between the predicted vector and the motion vector is variable-length encoded. The accuracy of prediction of each motion vector is however not sufficient. There is a problem that a large amount of coded bits is still necessary for motion vectors as to images complicated in motion particularly as in the case where plural moving objects exist.

CITATION LIST

Non Patent Literature

Non-Patent Literature 1: ITU-T Recommendation H.264/AVC

SUMMARY OF INVENTION

Technical Problem

In the above technique, a large amount of coded bits is still required for each motion vector because the accuracy of prediction of the motion vector is not sufficiently high.

The present invention has been made in view of the above problems. An object of the present invention is to improve a method for calculating a prediction vector to thereby reduce the amount of coded bits for each motion vector and improve compression efficiency.

Solution to Problem

In order to address the above problems, one embodiment of the present invention may be configured as described in Claims, for example.

Advantageous Effects of Invention

High-quality video can be provided with a small amount of coded bits.

DESCRIPTION OF EMBODIMENTS

Embodiments of the present invention will hereinafter be explained with reference to the accompanying drawings.

Figure 5:
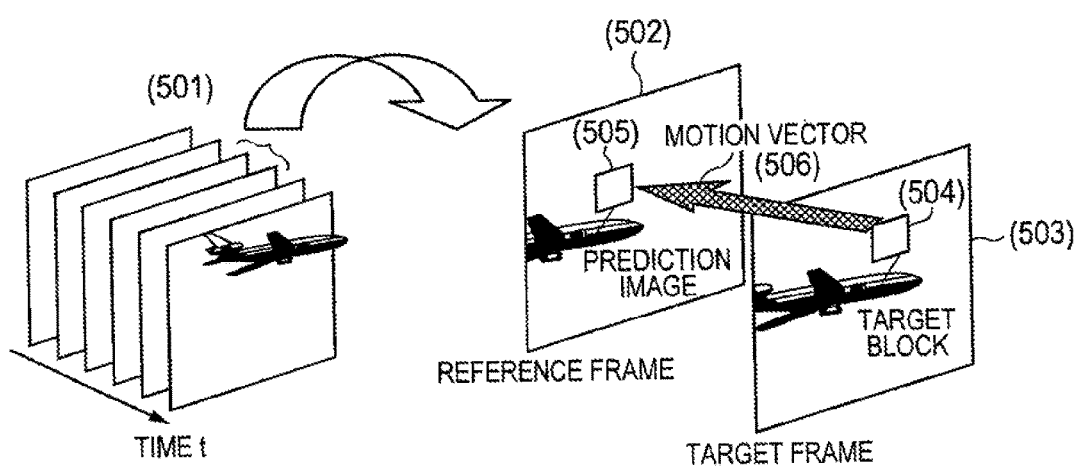
FIG. 5 is a conceptual explanatory diagram of inter prediction at H.264/AVC.

FIG. 5 conceptually shows the operation of an inter prediction process based on H.264/AVC.

In H.264/AVC, encoding based on block units is performed to a target frame for encoding in accordance with raster scan order. Upon execution of the inter prediction, a decoded image of an encoded image included in the same video (501) as the target frame (503) is assumed to be a reference frame (502). A block (predicted or prediction image) (505) high in correlation with a target block (504) in the target frame is searched from within the reference frame. At this time, a difference between coordinate values of both blocks is encoded as a motion vector (506) in addition to a prediction difference calculated as the difference between both blocks. On the other hand, a procedure opposite to the above may be performed upon decoding. The decoded prediction difference is added to the block (prediction image) (505) in the reference frame to thereby enable the acquisition of a decoded image.

In H.264/AVC, a prediction technique for each motion vector has been introduced to reduce overhead of the amount of coded bits due to the motion vector described above. That is, when a motion vector is encoded, a motion vector of a target block is predicted using an encoded block located around the target block, and a difference (difference vector) between the predicted vector and the motion vector is encoded. Since the magnitude of the difference vector concentrates on approximately 0 at this time, it is subjected to variable length coding, so that the amount of coded bits can be reduced.

Figure 6:
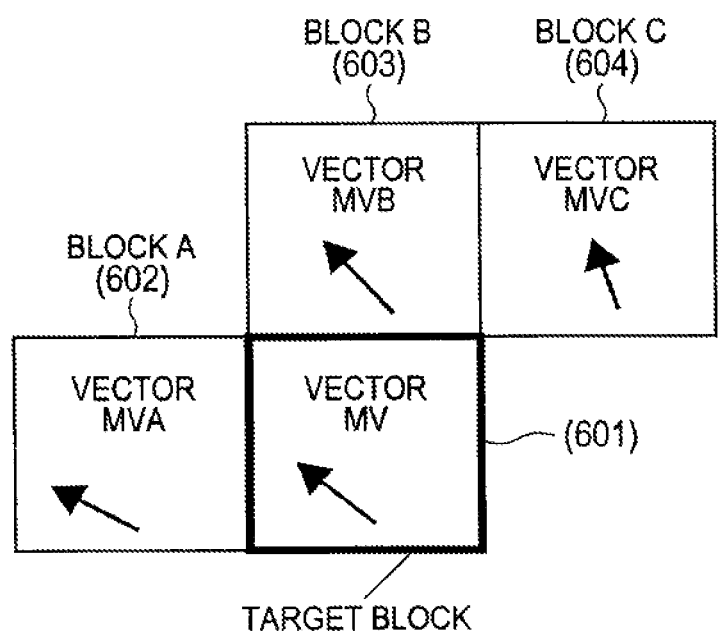
FIG. 6 is a conceptual explanatory diagram related to a prediction technique for motion vectors at H.264/AVC.

FIG. 6 conceptually shows a method for calculating a prediction vector. Encoded blocks adjacent to the left, upper and upper right sides of a target block (601) are assumed to be a block A (602), a block B (603) and a block C (604) respectively. Motion vectors MV in the respective blocks are assumed to be MVA, MVB and MVC respectively. At this time, a prediction vector is represented as a median among MVA, MVB and MVC. That is, the prediction vector PMV is computed like (605) using a function Median in which a median value is returned to respective components of a vector designated as an argument. Further, a difference vector DMV is calculated as a difference (606) between the motion vector MV of the target block and the prediction vector PMV. Subsequently, the difference vector DMV is variable-length encoded. Upon decoding, a procedure opposite to the above may be performed. The decoded difference vector DMV is added to a prediction vector PMV calculated by a procedure similar to the above to thereby decode a motion vector MV.

In H.264/AV as described above, the introduction of the prediction technique into the motion vectors makes it possible to greatly reduce the amount of coded bits necessary for each motion vector. In the case of H.264/AVC, however, only adjacent blocks are taken into consideration when the prediction vector is computed. It cannot be always said that the motion of an object has been reflected. Therefore, particularly when plural moving objects exist in an adjacent area, the prediction accuracy of motion vectors was not enough and the motion vectors still needed to have a large amount of coded bits. In an aspect of the present invention, motion vectors close in value to each other, of motion vectors in an encoded area are combined to estimate the existence of a motion area and its range. A prediction vector is calculated based on a motion vector of the motion area that exists in the vicinity of a target area, thereby making it possible to improve the prediction accuracy for the motion vector.

A method for calculating a prediction vector PMV, according to the present invention will be explained below.

A procedure for calculating the prediction vector PMV is the same as on the encoding and decoding sides. On the encoding side, a process for computing a difference vector DMV between a motion vector MV and a prediction vector PMV and encoding it is carried out. On the decoding side, a process for adding the prediction vector PMV to the decoded difference DMV and thereby decoding the motion vector MV is carried out.

Embodiment 1

The embodiment 1 uses information about a combined area when a prediction vector of a target block is computed. That is, when the combined area exists around the target block, it is determined that the target block also includes a part of the same object as that included in the combined area. The prediction vector is calculated based on the motion vector of each block included in the combined area.

Thus, since the prediction vector can be calculated based on a motion vector of a motion area that exists in the vicinity of a target area, it is possible to improve prediction accuracy for the motion vector. Further, the method of calculating the prediction vector is improved to reduce the amount of coded bits for the motion vector and enable an improvement in compression efficiency.

Figure 7:
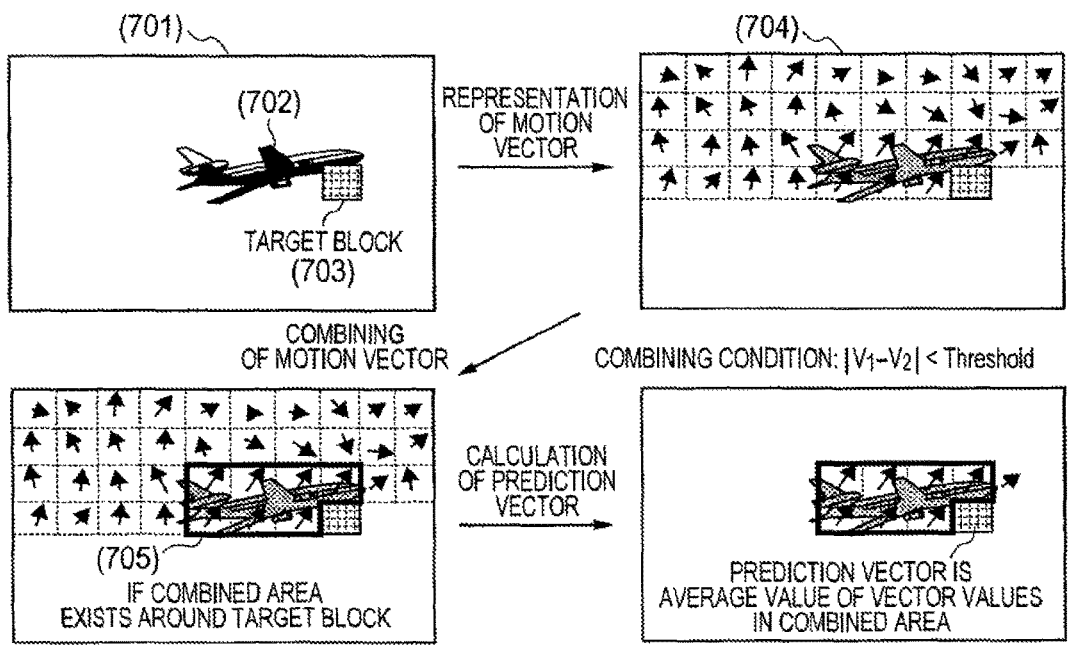
FIG. 7 is a conceptual explanatory diagram related to a prediction technique for motion vectors in embodiments 1, 2 and 3.

FIG. 7 is a diagram conceptually showing one example of a prediction vector PMV computing method according to the present embodiment.

Consider, for example, where a block (703) including a part of an object (702) is inter-encoded within a frame (701) in which the object (702) is reflected. In this case, motion vectors MV close to each other of motion vectors MV (704) of encoded areas which are located on the left of the target block (703) and thereabove, are first combined. When, for example, a combining condition |V1-V2|<Threshold is established, two motion vectors V1 and V2 are combined and included in the same area.

Now, |A| is assumed to be the magnitude of a vector A, and Threshold is assumed to be a constant. The constant Threshold may be set to a unique value in advance. Alternatively, values may be freely set on the encoding side and included in a coded or video stream. Further, the constant Threshold may be determined dynamically based on coding information about dispersed values of motion vectors MV, an average value thereof and the like, the magnitude of a combined area, etc. The constant Threshold may not comply with this equation in particular. Further, information other than the motion vectors MV, such as color information may be taken into consideration upon combining.

Generally, since motion vectors MV of an area including a part of the same object have the property of indicating values close to each other, the presence of the object (702) and its range can be specified by acquisition of a combined area (705).

In an aspect of the present invention, the information about the combined area (705) is utilized when a prediction vector PMV of the target block (703) is computed. That is, when the combined area (705) exists around the target block (703), the target block (703) is also determined to include a part of the same object as the object (702) included in the combined area (705). The prediction vector PMV is calculated based on motion vectors MV of blocks included in the combined area (705). Although irrespective of the computing method of the prediction vector PMV in particular, the prediction vector PMV may be calculated as an average value (AVE (C)) of the motion vectors MV in the combined area as in the case of, for example, an equation (706) of FIG. 7. Alternatively, the prediction vector PMV may be computed by selecting a typical motion vector MV in the combined area, such as an intermediate value of the motion vectors MV in the combined area.

Here, C is assumed to be a set of the motion vectors MV included in the combined area, and |C| is assumed to be the number thereof.

Figure 8:
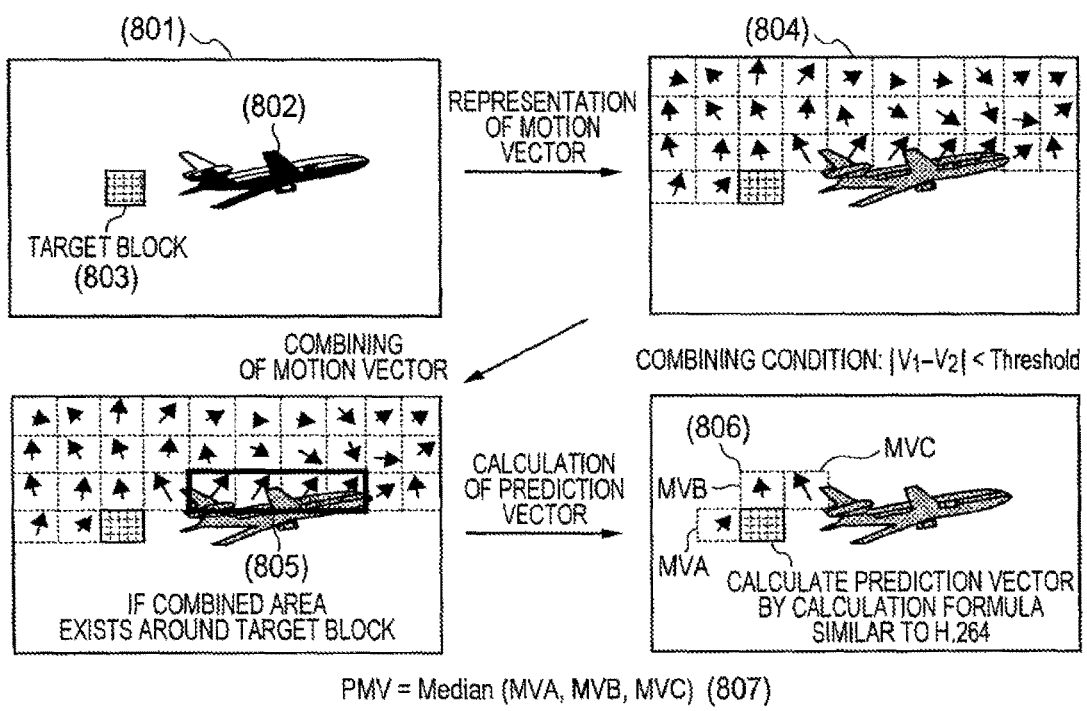
FIG. 8 is a conceptual explanatory diagram related to a prediction technique for motion vectors in the embodiments 1, 2 and 3.

A description will next be made of a case where no combined area (705) exists around the target block (703). When the combined area (705) does not exist around the target block (703), a prediction vector PMV is computed in accordance with a procedure shown in FIG. 8, for example. Now where in a frame (801) in which an object (802) similar to that of FIG. 7 is reflected, a block (803) away from the object (802) is inter-encoded. In this case, motion vectors MV (804) of encoded areas are combined by a procedure similar to FIG. 7 to obtain a combined area (805). The prediction vector PMV is computed by a conventional calculation formula (807) that uses motion vectors MV of blocks around the target block (803), such as H. 264 or the like (806). This is however not limited to H. 264 as the conventional method.

The configuration and operation of a moving picture encoding device according to the present embodiment will next be explained.

Figure 1:
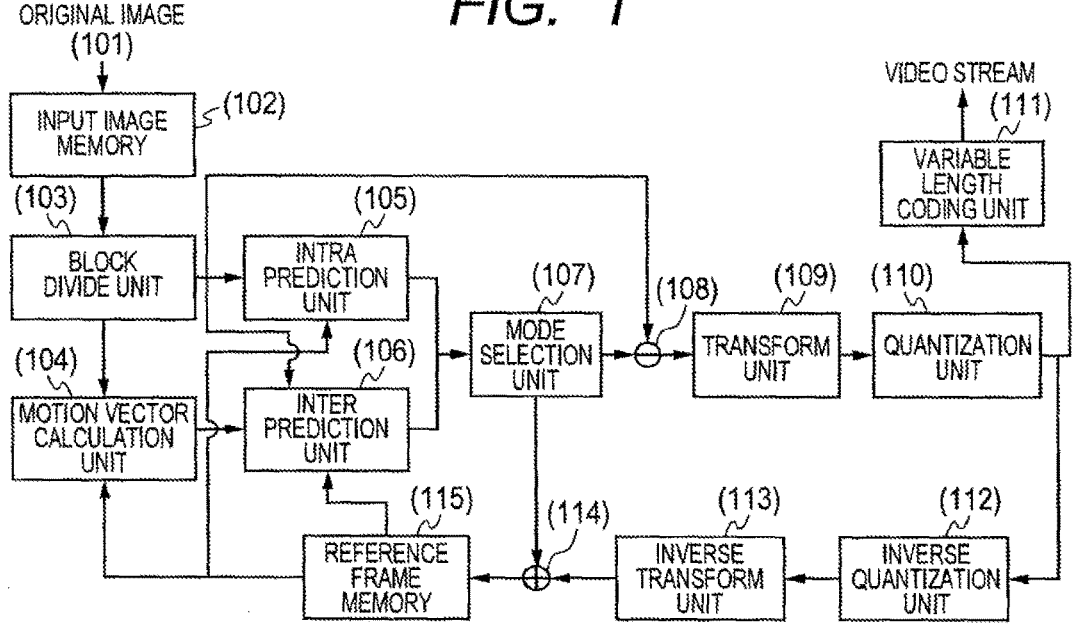
FIG. 1 is a block diagram of an image encoding device according to the present invention.

FIG. 1 shows one example of the moving picture encoding device according to the present embodiment.

The moving picture encoding device according to the present embodiment includes an input image memory (102) which holds an input original image (101), a block divide unit (103) which divides image data inputted from the input image memory (102) into plural areas, an intra prediction unit (105) which performs intra prediction in block units, a motion vector calculation unit (104) which performs a motion vector calculation to image data inputted from the block divide unit (103), an inter prediction unit (106) which performs inter prediction in block units using motion vectors MV detected by the motion vector calculation unit (104), a mode selection unit (107) which determines a prediction encoding means (prediction method and block size), a subtraction unit (108) which generates residual data, a transform unit (109) which performs transformation to the residual data, a quantization unit (110) which quantizes the residual data inputted from the transform unit (109), a variable length coding unit (111) which performs variable length coding to the data quantized by the quantization unit (110), an inverse quantization unit (112) which inversely quantizes the residual data inputted from the quantization unit (110), an inverse transform unit (113) which inversely transforms the data inversely quantized by the inverse quantization unit (112), an addition unit (114) which generates a decoded image using the inversely transformed data, and a reference frame memory (115) which holds the decoded image therein.

The operations of the respective component parts of the moving picture encoding device according to the present embodiment will be explained.

The input image memory (102) retains a single image of the original image (101) as a target frame for encoding and outputs it to the block divide unit (103). The block divide unit (103) divides the original image (101) into plural blocks and outputs the same to the motion vector calculation unit (104), the intra prediction unit (105) and the inter prediction unit (106). The motion vector calculation unit (104) computes each motion vector MV of a target block using a decoded image stored in the reference frame memory (115) and outputs the same to the inter prediction unit (106). The intra prediction unit (105) and the inter prediction unit (106) perform an intra prediction process and an inter prediction process in block units. The mode selection unit (107) refers to the results of the intra prediction process and the inter prediction process and thereby selects a prediction encoding means optical to either thereof. Subsequently, the subtraction unit (108) generates residual data by the optimal prediction encoding means and outputs the same to the transform unit (109). The transform unit (109) and the quantization unit (110) perform transformation such as DCT (Discrete Cosine Transformation) and quantization processing to the input residual data respectively in block units and output the so-processed data to the variable length coding unit (111) and the inverse quantization unit (112). Here, they may perform processing using DST (Discrete Sine Transformation), WT (Wavelet Transformation), DFT (Discrete Fourier Transformation), KLT (Karhunen-Loeve Transformation), etc., in addition to the DCT. The variable length coding unit (111) performs variable length coding to residual information expressed by transform coefficients, and information necessary for decoding such as prediction direction data used when intra prediction is performed, moving vectors MV used when inter prediction is performed, etc., based on the probability of occurrence of codes like the assignment of a short code length to a code high in the frequency of its occurrence and the like to thereby generate a coded or video stream. The inverse quantization unit (112) and the inverse transform unit (113) perform inverse quantization and inverse transformation such as IDCT (Inverse DCT) to the post-quantization transform coefficients to obtain residual data and output the same to the addition unit (114). The addition unit (114) generates a decoded image and outputs the same to the reference frame memory (115). The reference frame memory (115) stores the generated decoded image therein.

Figure 2:
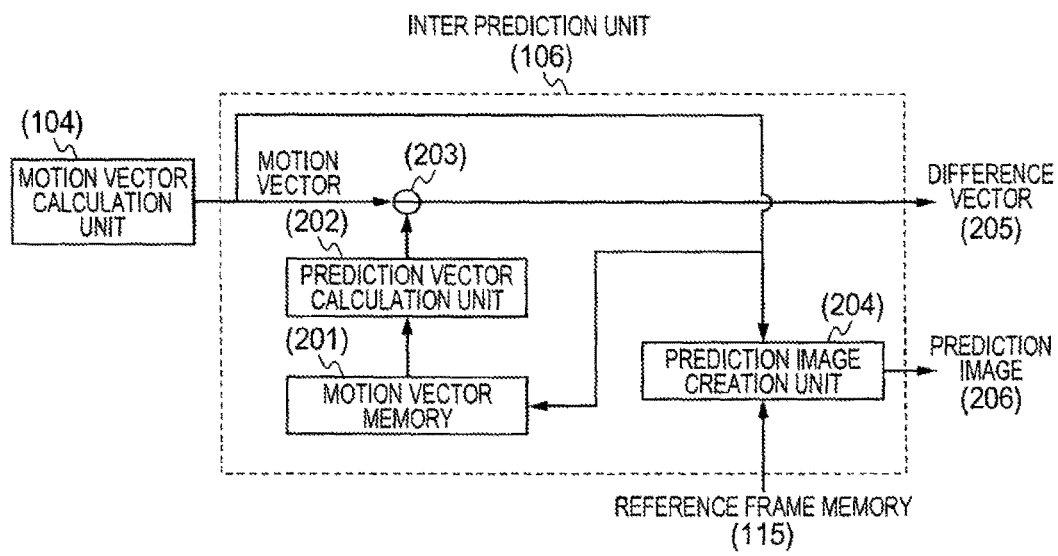
FIG. 2 is a block diagram of the image encoding device according to the present invention.

The inter prediction unit (106) will be explained using FIG. 2.

The inter prediction unit (106) includes a motion vector memory (201) for storing a motion vector MV of each encoded area, a prediction vector calculation unit (202) which calculates a prediction vector PMV using the motion vector MV of each encoded area, a subtraction unit (203) which calculates a difference between the motion vector MV and the prediction vector PMV to calculate a difference vector DMV, and a prediction image creation unit (204) which generates a prediction image.

The operations of the respective component parts of the inter prediction unit (106) will be explained.

The prediction vector calculation unit (202) calculates a prediction vector PMV of a target block based on each of the motion vectors MV of the encoded areas, stored in the motion vector memory (201). The subtraction unit (203) calculates a difference between the motion vector MV calculated by the motion vector calculation unit (104) and the prediction vector PMV to calculate a difference vector DMV (205). The prediction image creation unit (204) generates a prediction image (206) from the motion vector MV and its corresponding reference frame. The motion vector memory (201) stores the motion vectors MV therein.

Figure 3:
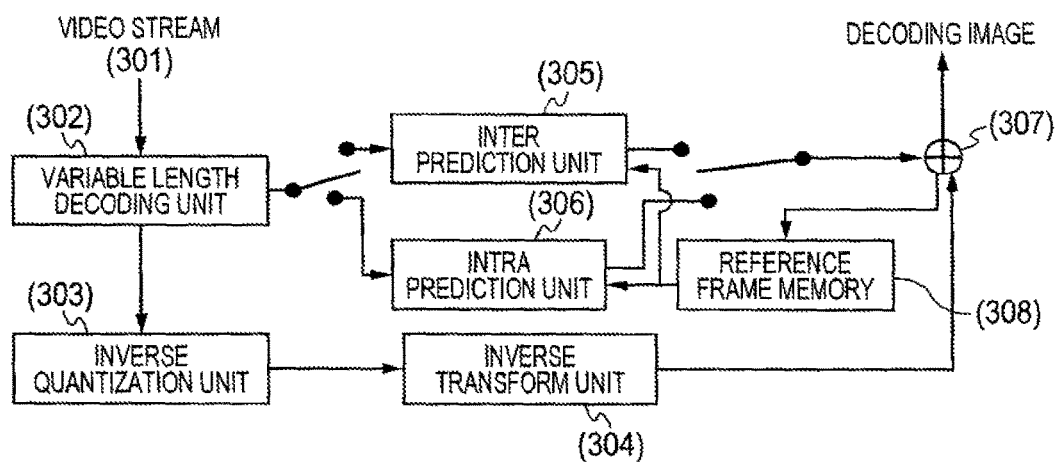
FIG. 3 is a block diagram of an image decoding device according to the present invention.

FIG. 3 shows one example of a moving picture decoding device according to the present embodiment.

The moving picture decoding device according to the present embodiment includes, for example, a variable length decoding unit (302) which performs a procedure opposite to variable length coding to the video stream (301) generated by the moving picture encoding device shown in FIG. 1, an inverse quantization unit (303) which inversely quantizes residual data, an inverse transform unit (304) which performs inverse transformation to the data inversely-quantized by the inverse quantization unit (303), an inter prediction unit (305) which performs inter prediction, an intra prediction unit (306) which performs intra prediction, an addition unit (307) which generates a decoded image, and a reference frame memory (308) which stores the decoded image therein.

The operations of the respective component parts of the moving picture decoding device according to the present embodiment will be explained.

The variable length decoding unit (302) performs variable length decoding to the video stream (301) to acquire information necessary for a prediction process, such as a residual transform coefficient component, a block size, motion vectors MV, etc. The residual transform coefficient component and the like are transmitted to the inverse quantization unit (303), and the block size and the motion vectors MV and so on are transmitted to the inter prediction unit (305) or the intra prediction unit (306). The inverse quantization unit (303) and the inverse transform unit (304) perform inverse quantization and inverse transformation to the residual information respectively to decode the residual data. The inter prediction unit (305) and the intra prediction unit (306) perform a prediction process based on the image information inputted from the variable length decoding unit (302) and the reference frame stored in the reference frame memory (308). The addition unit (307) generates a decoded image based on the residual data inputted from the variable length decoding unit (302) and the prediction image data inputted from the inter prediction unit (305) or the intra prediction unit (306). The reference frame memory (308) stores the decoded image inputted from the addition unit (307).

Figure 4:
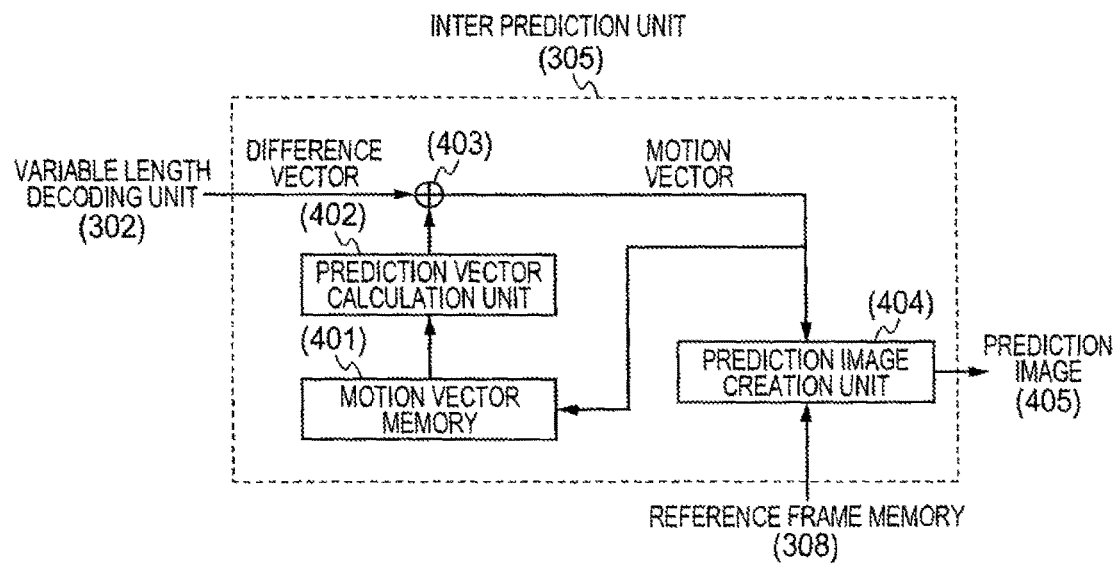
FIG. 4 is a block diagram of the image decoding device according to the present invention.

The inter prediction unit (305) will be described using FIG. 4. The inter prediction unit (305) includes a motion vector memory (401) which stores a motion vector MV of each decoded area, a prediction vector calculation unit (402) which calculates a prediction vector PMV using the motion vector MV of each decoded area, an addition unit (403) which calculates the sum of the difference vector DMV and the prediction vector PMV to calculate a motion vector MV, and a prediction image creation unit (404) which generates a prediction image.

The operations of the respective component parts of the inter prediction unit (305) will be explained.

The prediction vector calculation unit (402) calculates a prediction vector PMV of a target block, based on the motion vector MV of each decoded area stored in the motion vector memory (401). The addition unit (403) calculates the sum of the difference vector DMV decoded by the variable length decoding unit (302) and the prediction vector PMV to decode the corresponding motion vector MV. The motion vector memory (401) stores the decoded motion vector MV therein. The prediction image creation unit (404) generates a prediction image (405) from the motion vector MV and the reference frame.

Figure 12:
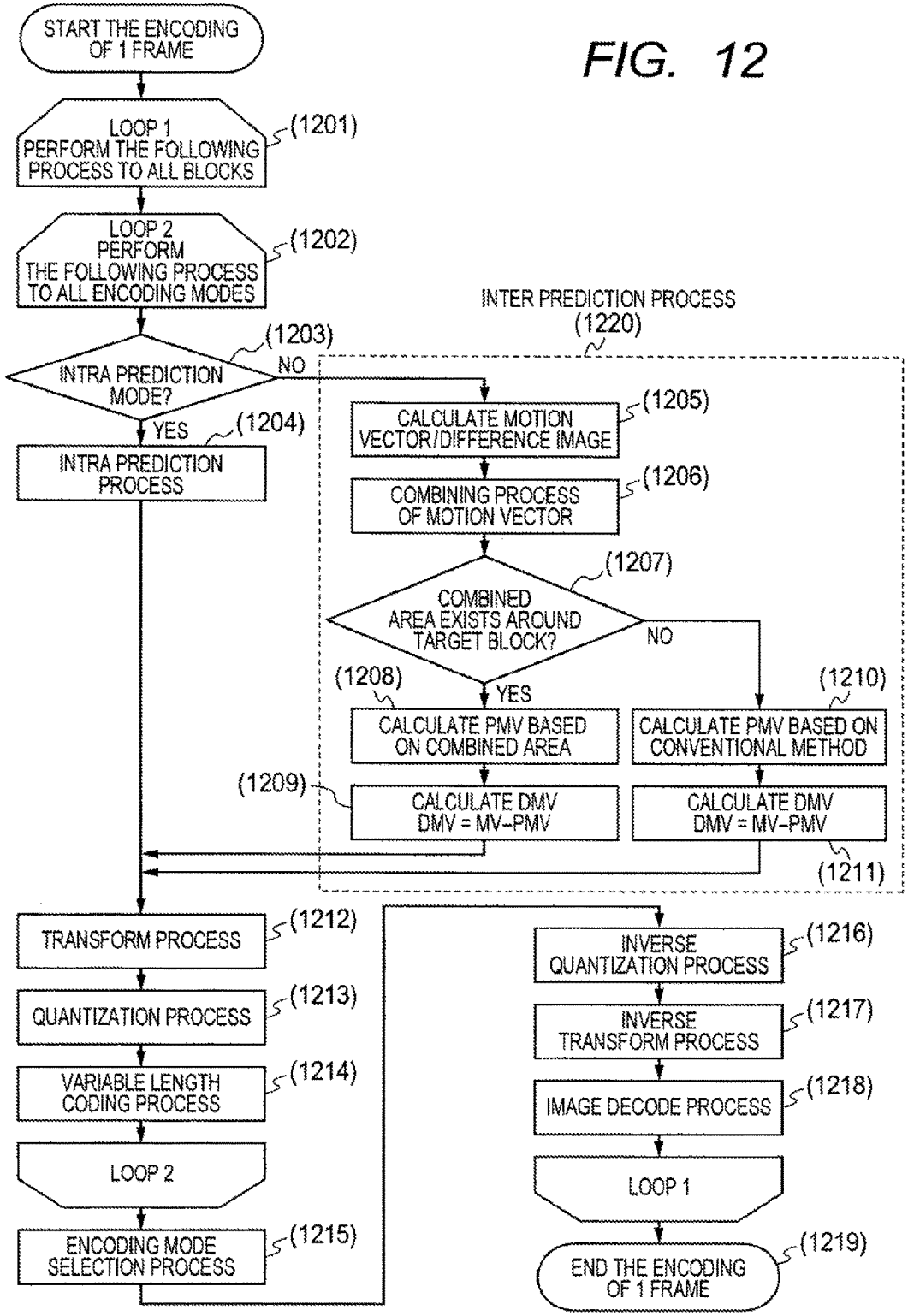
FIG. 12 is a flowchart of an image encoding method according to the present invention.

FIG. 12 is a diagram showing a procedure for encoding processing in the present embodiment.

The following processes are performed to all blocks that exist within a frame, which are targeted for encoding (1201). That is, prediction is performed to all encoding modes (combination of a prediction method and a block size) for every target block (1202). Here, intra prediction (1204) or inter prediction (1220) is performed according to a prediction mode to carry out the calculation of a residual. Further, when the inter prediction (1220) is performed, each motion vector MV is encoded in addition to the residual (1205). A combining process is performed to the motion vectors MV of the encoded area (1206). It is determined whether a combined area exists around the target block (1207). If the combined area exists around the target block, a prediction vector PMV is calculated based on the motion vectors MV included in the combined area (1208). A difference between the prediction vector PMV and its corresponding motion vector MV is calculated to thereby obtain a difference vector DMV (1209). On the other hand, if the combined area does not exist around the target block, a prediction vector PMV is calculated by the conventional method such as H.264 (1210) to thereby acquire a difference vector DMV (1211). Subsequently, a transform process (1212), a quantization process (1213) and a variable length coding process (1214) are performed to residual data to thereby calculate image-quality distortion and the amount of coded bits in each encoding mode. If the aforementioned processing is completed with respect to all the encoding modes, the encoding mode best in coding efficiency is selected based on the above result of processing (1215). Incidentally, for example, the RD-Optimization method for determining the optimal encoding mode from the relationship between the image-quality distortion and the amount of coded bits is used to select the encoding mode best in coding efficiency out of the plural encoding modes, thereby making it possible to perform encoding efficiently. For the details of the RD-Optimization method, refers to a Reference Literature 1.

Reference Literature 1

G. Sullivan and T. Wiegand: "Rate-Distortion Optimization for Video Compression", IEEE Signal Processing Magazine, vol. 25, no. 6, pp. 74-90, 1998.

Subsequently, an inverse quantization process (1216) and an inverse transform process (1217) are performed to the quantized transform coefficient in the selected encoding mode to decode the residual data, thereby generating a decoded image (1218), which in turn is stored in the reference frame memory. If the aforementioned processing is completed with respect to all blocks, the encoding of an image of 1 frame is ended (1219).

Figure 13:
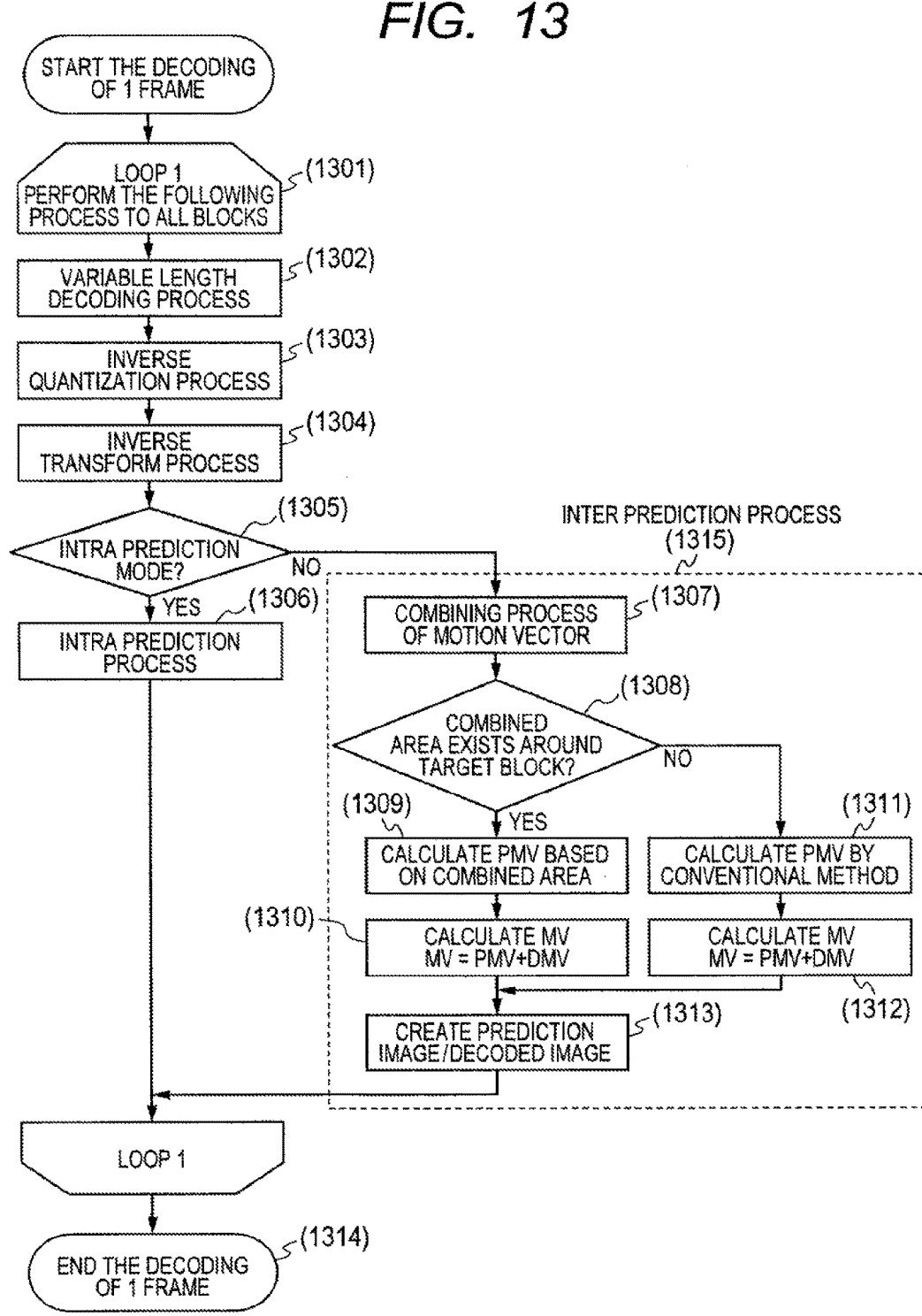
FIG. 13 is a flowchart of an image decoding method according to the present invention.

FIG. 13 is a diagram showing a procedure for the decoding of 1 frame in the present embodiment.

The following processes are first performed to all blocks in one frame (1301). That is, a variable length decoding process is performed to an input stream (1302). Then, an inverse quantization process (1303) and an inverse transform process (1304) are performed to decode residual data. Subsequently, an intra prediction process (1306) and an inter prediction process (1315) are performed according to a prediction mode. Incidentally, the decoding of each motion vector MV is performed upon execution of inter prediction. Here, a combining process is performed to each motion vector MV of the decoded area (1307). It is determined whether a combined area exists around a target block (1308). If the combined area exists around the target block, a prediction vector PMV is calculated based on the motion vectors MV included in the combined area (1309). The prediction vector PMV and its corresponding difference vector DMV are added to obtain a motion vector MV of the target block (1310). On the other hand, if the combined area does not exist around the target block, a prediction vector PMV is calculated by the conventional method such as H.264 (1311) and a motion vector MV is calculated (1312). Then, the generation of a prediction image and a decoded image are performed using the calculated motion vector MV (1313). If the aforementioned processing is completed with respect to all the blocks in the frame, the decoding of an image of one frame is completed (1314).

Incidentally, in the present embodiment, the calculation of the prediction vector PMV is performed in block units. Even at other than the above, however, the prediction vector may be calculated in units of objects discrete from the background of an image, for example. Although DCT has been taken as one example of the transformation, any of DST (Discrete Sine Transformation), WT (Wavelet Transformation), DFT (Discrete Fourier Transformation), KLT (Karhunen-Loeve Transformation), etc. may be adopted if it takes transform used in the elimination of an inter-pixel correlation. In particular, coding may be performed to a residual itself without performing transformation. Further, the variable length coding may not be performed. In the present embodiment, the prediction vector PMV is calculated based on the motion vectors MV included in the combined area, but each motion vector itself may be calculated using it.

In the present embodiment, when the combined area exists around the target block, the target block is also determined to include a part of the same object as that included in the combined area, and the corresponding prediction vector is calculated based on motion vectors of blocks included in the combined area. It is thus possible to improve prediction accuracy for each motion vector. The method of calculating the prediction vector is improved to make it possible to reduce the amount of coded bits for each motion vector and improve the efficiency of compression.

Embodiment 2

In the embodiment 1, the prediction accuracy is improved where the target block is included in its corresponding peripheral object area. On the other hand, in the embodiment 2, a prediction vector PMV of a target block is calculated using encoded or decoded previous frames. It is thus possible to improve prediction accuracy where a target block is located in the boundary of object areas, for example.

Figure 9:
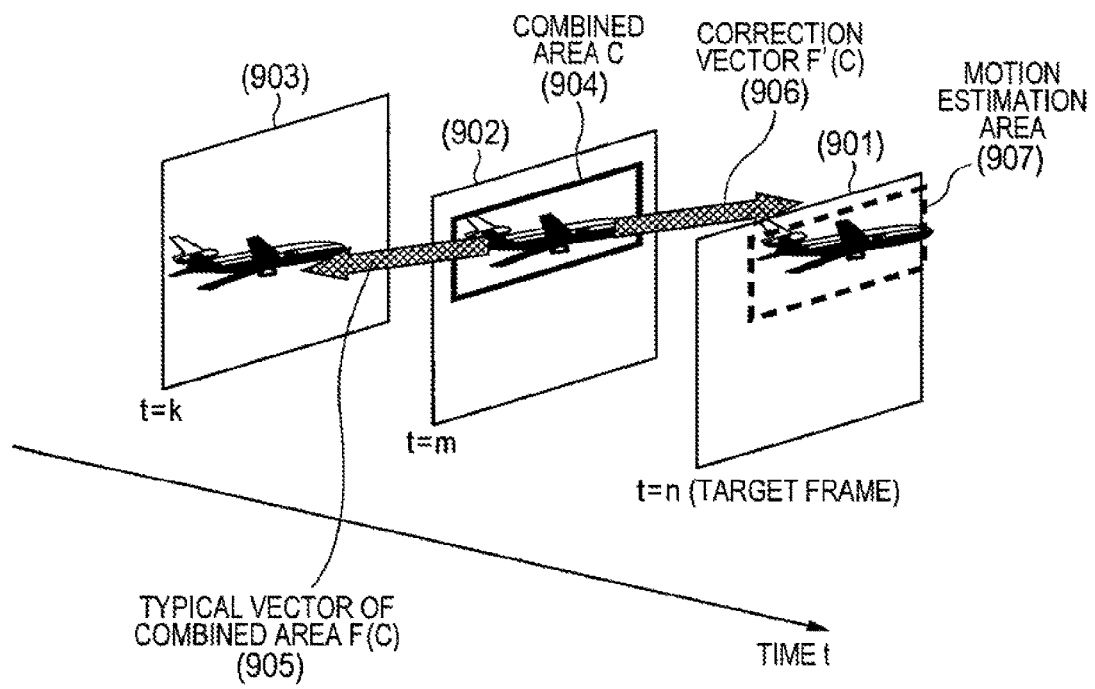
FIG. 9 is a conceptual explanatory diagram related to a prediction technique of motion vectors in the embodiment 2.

FIG. 9 is a diagram showing one example using encoded previous frames.

Here, the combining of motion vectors MV is performed to a frame (display time t=m) (902) preceding a target frame (display time t=n) (901) by a procedure similar to that in the embodiment 1. The frame (902) refers to a frame (display time t=k) (903) further preceding it, and a destination to move a combined area (904) in the frame (902) can be represented by a typical value F(C) (905) of a motion vector MV included in the combined area. Here, the typical value F(C) may be calculated by the average value of the motion vectors MV included in the combined area, a weighted average value, a median value and the like. Incidentally, assume k<m<n. Considering the values of k, m, and n at this time, a correction vector F' (C) (906) for estimating where the combined area (904) is moved within the target frame (901) can be calculated using an equation (908), for example. Thus, a motion estimation area (907) on the target frame (903) corresponding to the combined area (904) in the previous frame (902) can be estimated.

When the target block is included in the area (907), a prediction vector PMV is calculated based on the motion vectors MV included in the combined area (904). For example, the prediction vector PMV may be calculated as an average value AVE (C) of the motion vectors MV included in the combined area (904), or one vector included in the combined area (904) may be selected. Alternatively, the prediction vector PMV may be calculated using the conventional method such as H.264. Further, the prediction vector PMV can be computed by, for example, equations (909), (910), (911) and so on.

Since the configurations of the moving picture encoding device and the moving picture decoding device according to the present embodiment are similar to the configurations of the moving picture encoding device and the moving picture decoding device shown in FIGS. 1 through 4 in the embodiment 1, the description of these is omitted.

Figure 14:
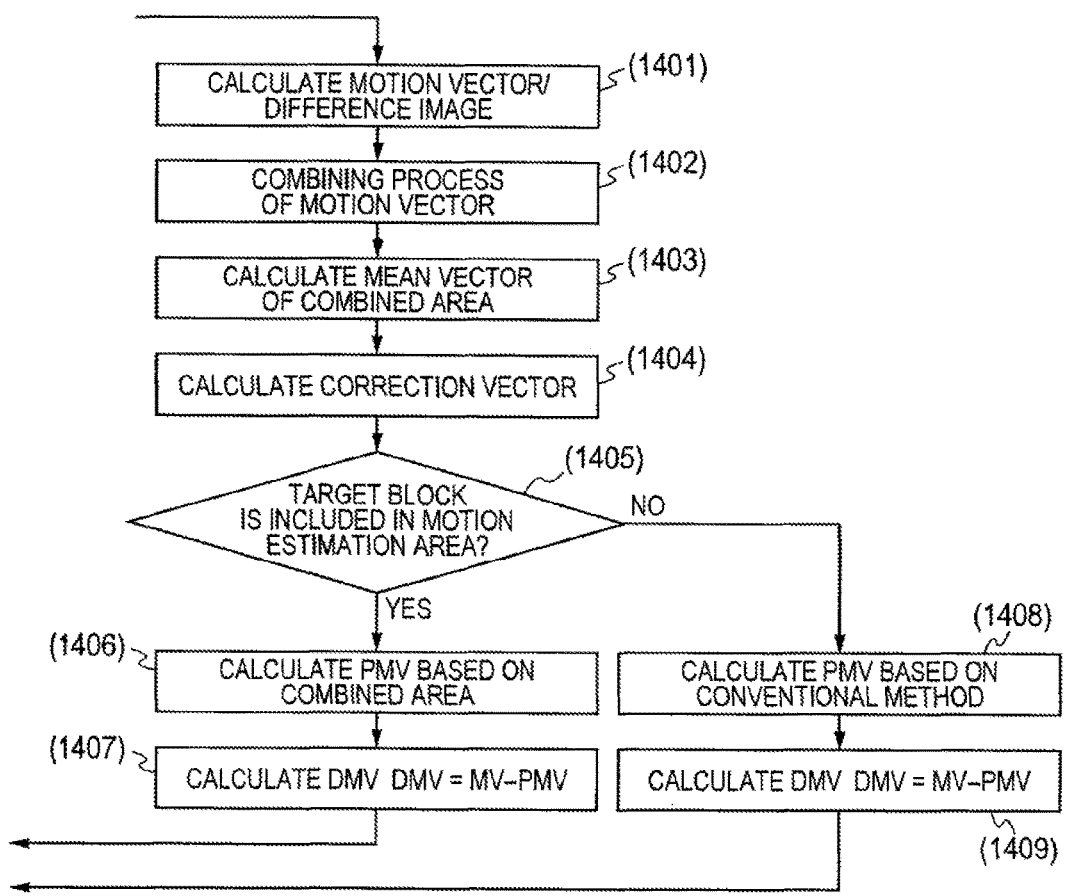
FIG. 14 is a flowchart of the image encoding method according to the present invention.

FIG. 14 is a diagram showing a procedure of encoding in the present embodiment. Only the inter prediction process (1220) shown in FIG. 12 is described herein. Since other operations are taken to carry out a procedure similar to FIG. 12, their description is omitted.

A motion vector calculation and a difference image calculation are first conducted (1401). Subsequently, a combining process is performed to motion vectors MV in a previous frame (1402), whereby a typical vector (effective if calculated as an average value vector, for example, and hereinafter be described as "average vector") of a combined area is calculated (1403). Then, a correction vector indicative of where a combined area in a previous frame is moved within a coding target frame is calculated based on time information on the average vector and the previous frame (1404) to thereby specify a motion estimation area. It is determined whether a target block is included in the motion estimation area (1405). If the target block is included in the motion estimation area, a prediction vector PMV is computed based on the motion vectors MV included in the combined area (1406). A method for calculating the prediction vector PMV is as shown in FIG. 9. Next, a difference between the prediction vector PMV and its corresponding motion vector MV is calculated to obtain a difference vector DMV (1407). On the other hand, if the target block is not included in the motion estimation area, a prediction vector PMV is calculated by the conventional method such as H. 264 (1408) to obtain a difference vector DMV (1409).

Figure 15:
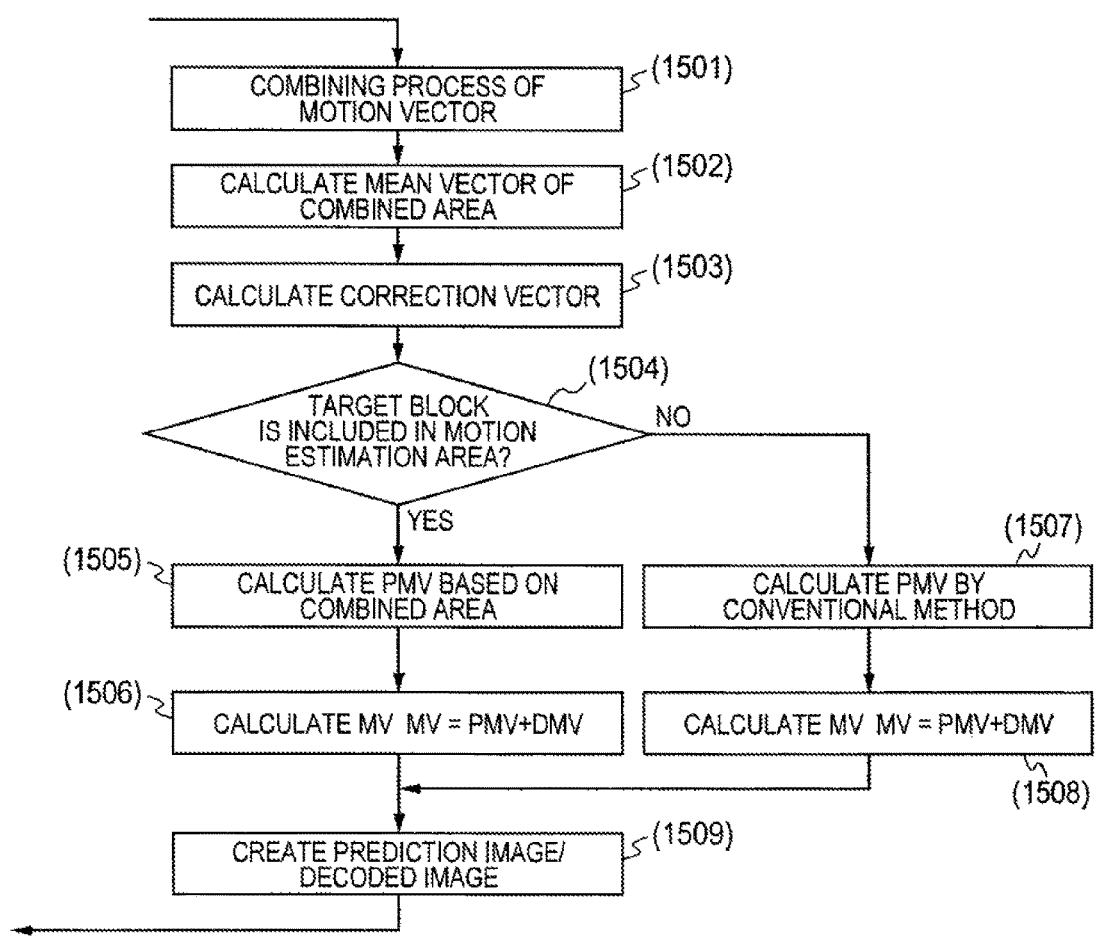
FIG. 15 is a flowchart of the image decoding method according to the present invention.

FIG. 15 is a diagram showing a procedure of decoding in the present embodiment. Only the inter prediction process (1315) shown in FIG. 13 is described herein. Since other operations are taken to conduct a procedure similar to FIG. 13, their description is omitted.

A combining process is performed to motion vectors MV in a previous frame (1501), and an average vector of a combined area is calculated (1502). Subsequently, a correction vector indicative of where a combined area in a previous frame is moved within a coding target frame is calculated based on the times of the average vector and the previous frame (1503) to specify a motion estimation area. It is determined whether a target block is included in the motion estimation area (1504). If the target block is included in the motion estimation area, a prediction vector PMV is calculated based on the motion vectors MV included in the combined area (1505). The sum of the prediction vector PMV and a difference vector DMV is calculated to obtain a motion vector MV (1506). On the other hand, if the target block is not included in the motion estimation area, a prediction vector PMV is calculated by the conventional method such as H. 264 (1507). A method for calculating the prediction vector PMV is as shown in FIG. 9. Next, the sum of the prediction vector PMV and the difference vector DMV is computed to calculate a motion vector MV (1508). Finally, a prediction image and a decoded image are generated based on the calculated motion vectors MV (1509), whereby image decoding is carried out.

Although the calculation of the prediction vector PMV is carried out in block units in the present embodiment, the prediction vector may be calculated in units of objects discrete from the background of an image, for example, even at other than the above. Further, the present embodiment and the embodiment 1 may be combined together.

In the present embodiment, the prediction vector PMV of the target block is calculated using the encoded or decode previous frames. It is thus possible to improve prediction accuracy where a target block is located in the boundary of object areas, for example.

Embodiment 3

Figure 10:
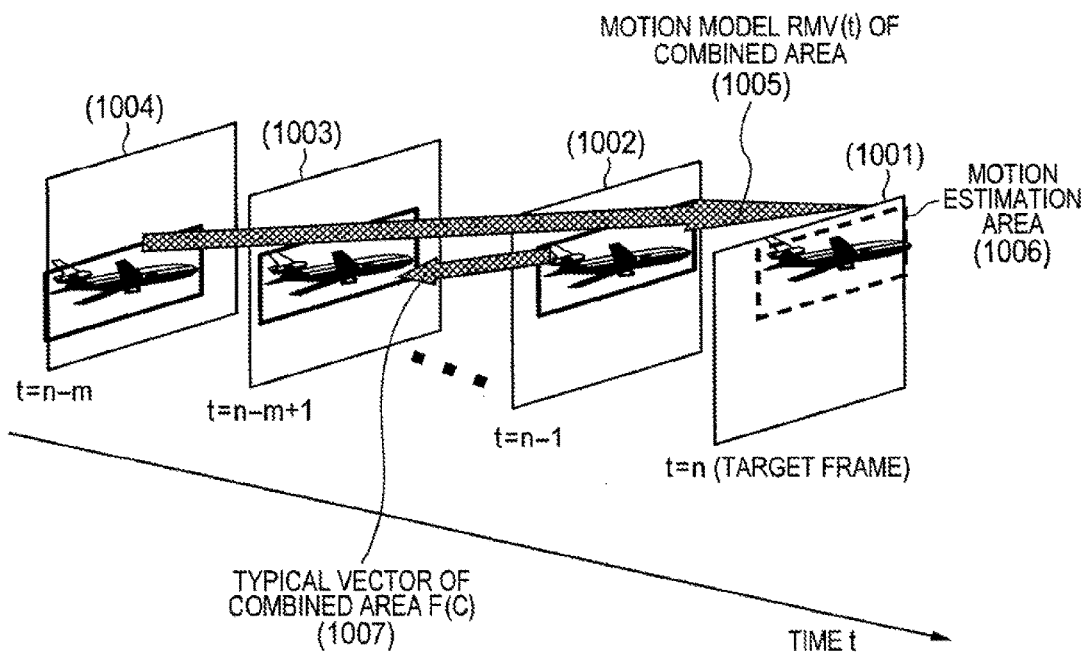
FIG. 10 is a conceptual explanatory diagram related to the prediction technique for motion vectors in the embodiment 3.

In the embodiment 2, the destination (907) to move the combined area (904) was estimated using the correction vector (906) calculated by the average vector (905) of the combined vector (904). On the other hand, in the embodiment 3, the motion of a combined area is modeled in mathematical expressions as shown in FIG. 10. If this operation is performed on the encoding and decoding sides, it is then unnecessary to encode their motion parameters, thereby making it possible to prevent the amount of coded bits from increasing.

FIG. 10 is a diagram showing one example in which the motion of a combined area is modeled in mathematical expressions using encoded previous frames.

From loci of combined areas at previous frames (1002), . . . , (1003), and (1004) of a target frame (1001), the motion thereof is modeled by a time function RMV(t). A motion estimation area (1006) in the target frame (1001) is estimated by calculating RMV(n). As the function RMV(t) for modeling the motion, a model like a linear function such as will be indicated at (1008), for example, may be utilized. For example, functions such as an ellipse, a quadratic curve (parabola), a Bezier curve, a clothed curve, a cycloid, reflection, pendular movement, etc. may be utilized. At this time, motion parameters like A, B, C and D of (1008), for example, are required to perform the modeling of motion, but they may be freely set on the encoding side so as to be capable of being included in a stream. Alternatively, they may automatically be calculated from the loci of the combined areas. That is, if motion vectors MV are combined with respect to the respective previous frames (1002), . . . , (1003), and (1004), then a coordinate string (X1, Y1), . . . , (Xm−1, Ym−1), and (Xm, Ym) of combined areas can be obtained. For this reason, if these values are substituted into the equations such as (1008), and simultaneous equations are solved, the values of parameters can be determined. If this operation is performed on the encoding and decoding sides, there is no need to encode these motion parameters, thus making it possible to prevent the amount of coded bits from increasing.

Incidentally, the prediction vectors PMV in the motion estimation area (1006) calculated by the above function RMV(t) can be calculated by, for example, equations (1009), (1010), (1011) and so on.

Since the configurations of the moving picture encoding device and the moving picture decoding device according to the present embodiment are similar to the configurations of the moving picture encoding device and the moving picture decoding device shown in FIGS. 1 through 4 in the embodiment 1, the description of these is omitted.

Figure 16:
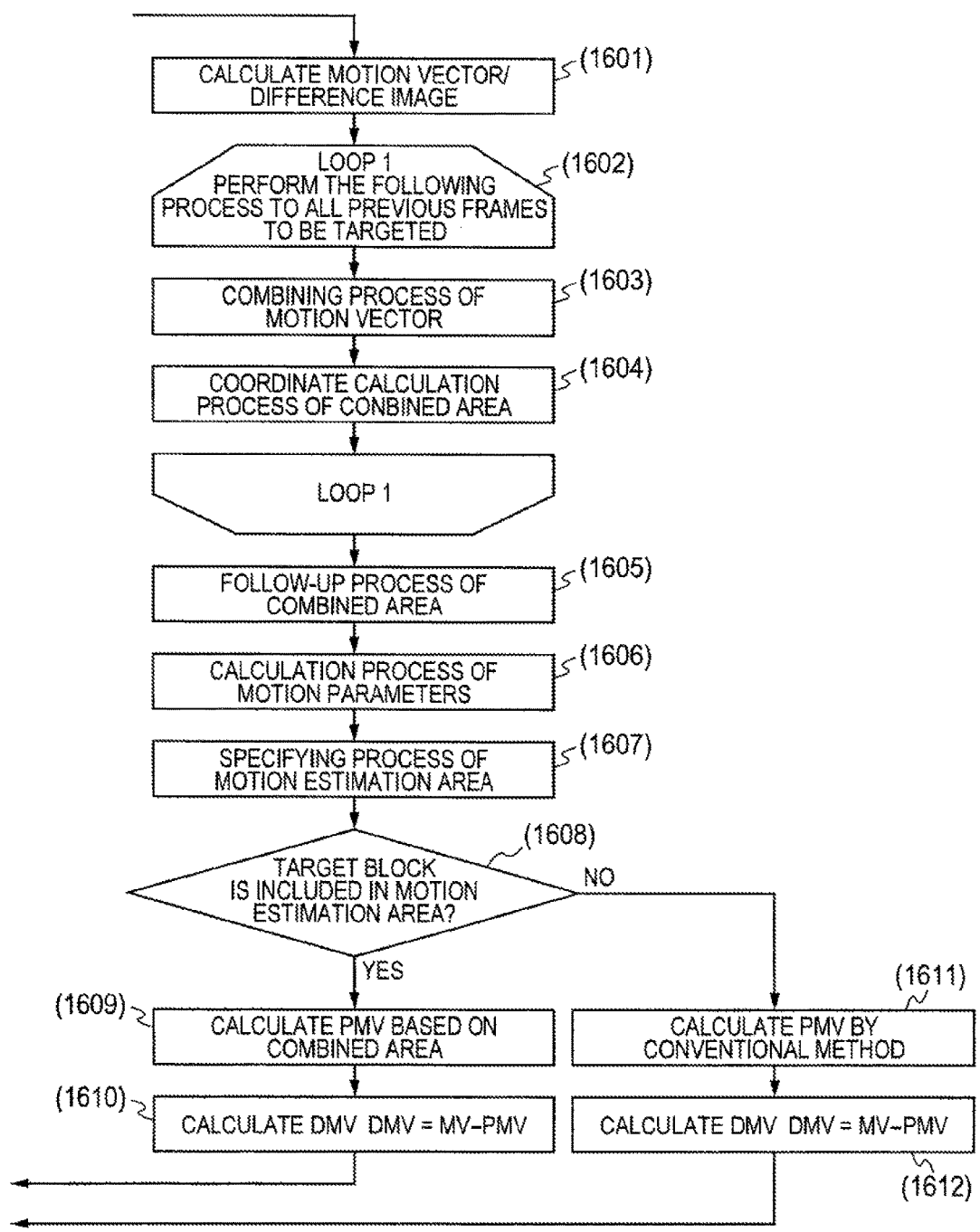
FIG. 16 is a flowchart of the image encoding method according to the present invention.

FIG. 16 is a diagram showing a procedure of encoding in the present embodiment. Only the inter prediction process (1220) shown in FIG. 12 is described herein. Since other operations are taken to carry out a procedure similar to FIG. 12, their description is omitted.

The calculation of each motion vector MV and a difference image is first carried out (1601). Next, the following processes are performed to all previous frames to be targeted (1602). That is, a combining process is performed to motion vectors MV of previous frames (1603). Typical coordinates of each combined area are calculated from the center of gravity of the combined area, for example (1604). If a coordinate string of the combined areas is obtained according to the above processing, a block close in distance to a target block or a previous block corresponding to the target block, of coordinates of combined areas detected in different frames, for example, is determined to be a block including the same object as the target block, whereby a follow-up process of the combined area is performed (1605). That is, the follow-up process is of a process for determining the combined area determined to include the same object as the target block for every previous frame and generating the coordinate string comprised of typical coordinates of the respective combined areas. Subsequently, motion modeling parameters are calculated from the coordinate string (1606). Using the calculated parameters, a check is made where the combined area of each previous frame is moved within a target frame, thereby specifying a motion estimation area in the target frame (1607). It is determined whether the target block is included in the motion estimation area (1608). If the target block is included in the motion estimation area, a prediction vector PMV is calculated based on the motion vectors MV included in the combined area (1609). A difference between the prediction vector PMV and its corresponding motion vector MV is computed to calculate a difference vector DMV (1610). On the other hand, if the target block is not included in the motion estimation area, a prediction vector PMV is calculated by the conventional method such as H. 264 (1611), and a difference vector DMV is calculated (1612).

Figure 17:
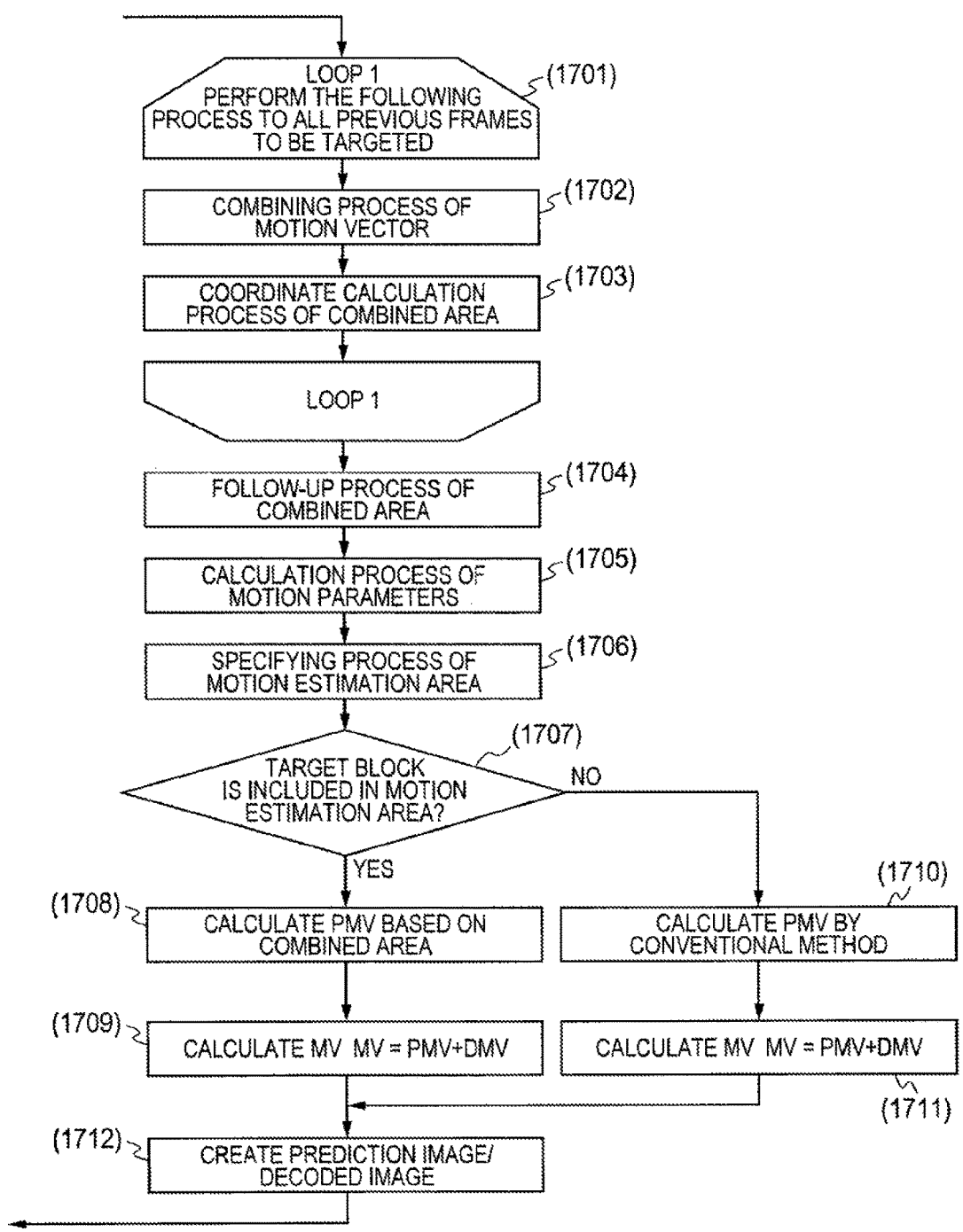
FIG. 17 is a flowchart of the image decoding method according to the present invention.

FIG. 17 is a diagram showing a procedure of decoding in the present embodiment. Only the inter prediction process (1315) shown in FIG. 13 is described herein. Since other operations are taken to carry out a procedure similar to FIG. 13, their description is omitted.

The following processes are first performed to all previous frames to be targeted (1701). That is, a combining process is performed to motion vectors MV of each previous frame (1702). Typical coordinates of each combined area are calculated from the center of gravity of the combined area, for example (1703). If a coordinate string of the combined areas is obtained according to the above processing, a block close in distance to a target block or a previous block corresponding to the target block, of coordinates of combined areas detected in different frames, for example, is determined to be a block including the same object, whereby a follow-up process of the combined area is performed (1704). Subsequently, motion modeling parameters are calculated from the coordinate string (1705). Using the calculated parameters, a check is made where the combined area of each previous frame is moved within a target frame, thereby specifying a motion estimation area (1706). It is determined whether the target block is included in the motion estimation area (1707). If the target block is included in the motion estimation area, a prediction vector PMV is calculated based on the motion vectors MV included in the combined area (1708). The sum of the prediction vector PMV and a difference vector DMV is computed to calculate a motion vector MV (1709). On the other hand, if the target block is not included in the motion estimation area, a prediction vector PMV is calculated by the conventional method such as H. 264 (1710), and a motion vector MV is calculated (1711). Finally, the generation of a prediction image and a decoded image is carried out based on the calculated motion vectors MV (1712).

Although the calculation of the prediction vector PMV is performed in block units in the present embodiment, the prediction vector may be calculated in units of objects discrete from the background of an image, for example, even at other than the above. Further, the present embodiment, the embodiment 1 and the embodiment 2 may be combined together.

In the present embodiment, the motion of the combined area is modeled in mathematical equations as shown in FIG.

10. If this operation is performed on the encoding and decoding sides, there is no need to encode motion parameters of these, thus making it possible to prevent the amount of coded bits from increasing.

Embodiment 4

In the embodiments 1 through 3, the prediction vector PMV is calculated using the entire screen of each previous frame or the motion vectors MV of the entire encoded area in the current frame. On the other hand, the embodiment 4 shows a method capable of obtaining advantageous effects similar to those of the embodiments 1 through 3 with a small amount of coded bits within the same frame as a target block and using only its peripheral blocks.

Since the configurations of the moving picture encoding device and the moving picture decoding device according to the present embodiment are similar to the configurations of the moving picture encoding device and the moving picture decoding device shown in FIGS. 1 through 4 in the embodiment 1, the description of these is omitted.

Figure 11:
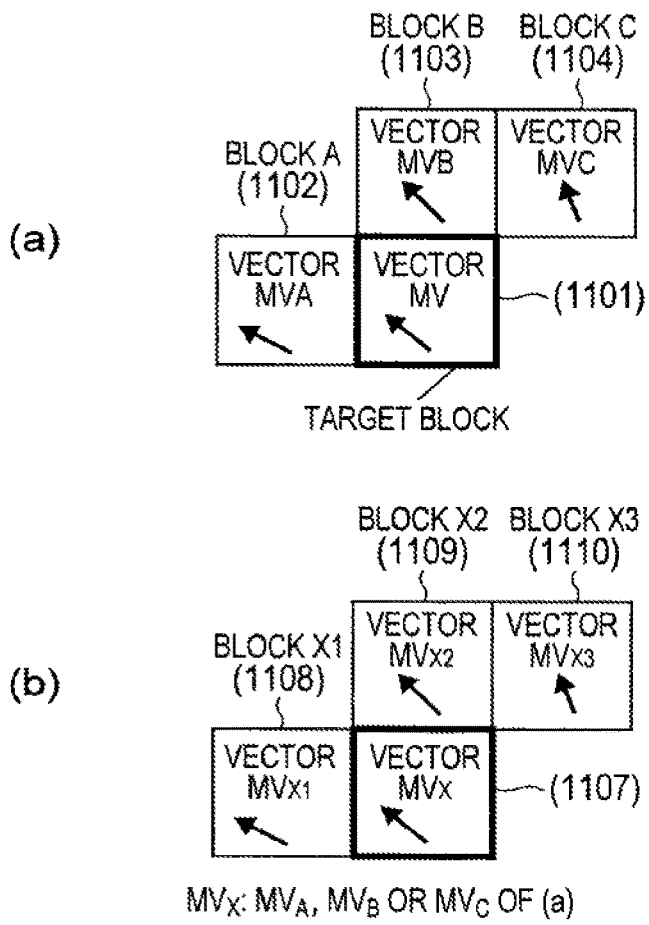
FIG. 11 is a conceptual explanatory diagram related to a prediction technique for motion vectors in an embodiment 4.

FIG. 11 conceptually shows one example of a prediction vector PMV calculating method by the present invention. Encoded blocks adjacent to the left, upper and upper right sides of a target block (1101) are assumed to be a block A (1102), a block B (1103) and a block C (1104) respectively. Motion vectors in the respective blocks are assumed to be MVA, MVB and MVC respectively. At this time, a function Cluster for calculating an inverse number of the degree capable of being combined with each peripheral vector is set to each vector MVX (MVX∈MVA, MVB, MVC). The Cluster (MVX) is calculated using it, and a vector at which the value of the Cluster (MVX) is brought to a minimum, is selected (1105).

Here, the function Cluster is effective if a function for calculating the sum of absolute differences between the respective vectors MVX and their peripheral vectors is set to each vector MVX (MVX∈MVA, MVB, MVC). That is, assuming that encoded blocks adjacent to the left, upper and upper right sides of a block X (X∈A, B, C) (1107) are assumed to be a block X1 (1108), a block X2 (1109) and a block X3 (1110) respectively, and motion vectors in the respective blocks are assumed to be MVX1, MVX2 and MVX3 respectively, the function Cluster is expressed as designated at (1111). The inner product of the motion vector MVX of the block X (X∈A, B, C) (1107) and each of motion vectors MVXn of the blocks X1, X2 and X3 may be calculated based on a value divided by the product of the absolute value of the motion vector of the block X (X∈A, B, C) (1107) and the absolute value of each of the motion vectors of the blocks X1, X2 and X3 (1112). If, however, there is provided one for calculating similarity between the motion vectors, it may not comply with these equations in particular.

Further, when the evaluation value Cluster (BESTMV) based on the selected vector is smaller than a constant Threshold2, it is judged that an object exists around a target block, and a prediction vector PMV is calculated based on the selected vector. This calculation method is not restricted in particular, but it is effective if, for example, the selected vector is set to the prediction vector PMV as it is (1106). On the other hand, if the evaluation value Cluster (BESTMV) based on the selected vector is greater than Threshold2, the object is determined not to exist around the target block, and a prediction vector PMV is calculated by a procedure similar to the conventional method such as H. 264 (1106). The constant Threshold2 may be set to a uniform value in advance. Alternatively, the value may be freely set on the encoding side and included in a video stream. Further, the constant Threshold2 may be determined dynamically based on coding information about dispersed values of motion vectors MV and an average value thereof, the magnitude of a combined area, etc. The constant Threshold2 may not comply with this equation in particular.

The present embodiment is capable of obtaining the same advantageous effect as where the motion vectors are combined with a small amount of coded bits, by using the above Cluster function. In the above embodiment, the block to which this function is applied is limited to the three types of blocks on the left, right and upper right sides of the target block, but the number of blocks to which this function is applied is not restricted in particular. Applying to four types of blocks added with a block on the upper left side, for example, provides a further improvement in prediction accuracy.

Figure 18:
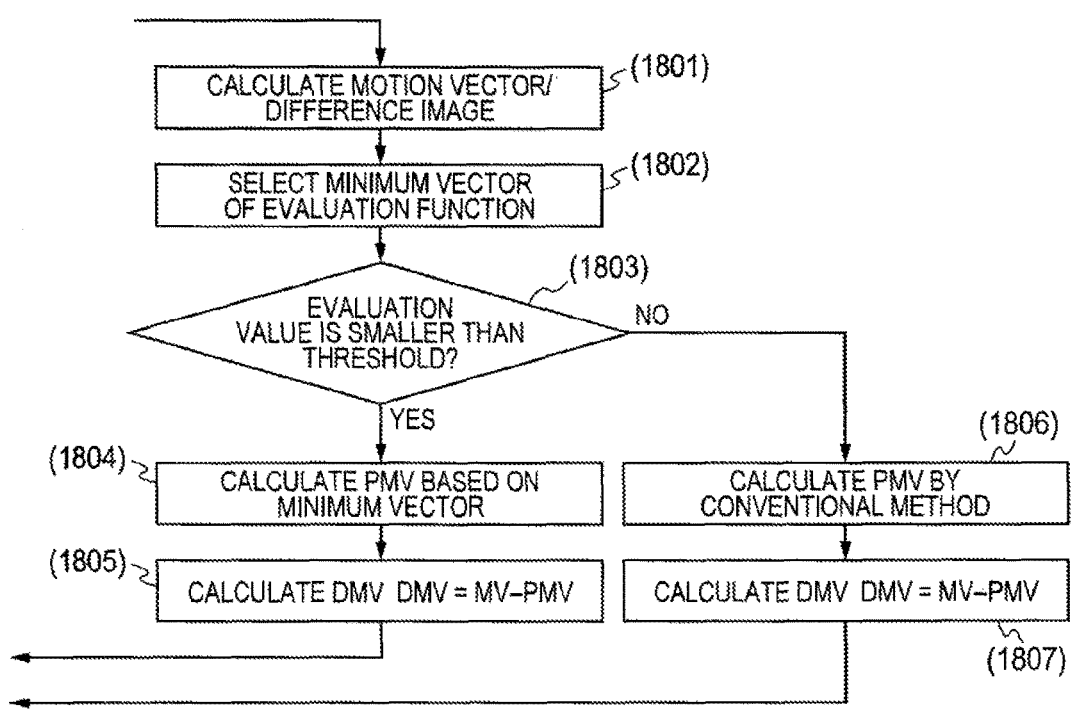
FIG. 18 is a flowchart of the image encoding method according to the present invention.

FIG. 18 shows a procedure of encoding in the present embodiment. Only the inter prediction process (1220) shown in FIG. 12 is described herein. Since other operations are taken to carry out a procedure similar to FIG. 12, their description is omitted.

The calculation of motion vectors and a difference image is first carried out (1801). Subsequently, a vector at which an evaluation value Cluster (MVx) indicative of similarity among motion vectors existing around a target block and further with peripheral motion vectors becomes minimum, is selected (1802). The evaluation value Cluster (BESTMV) and a threshold are compared with each other (1803). If the evaluation value Cluster (BESTMV) is smaller than the threshold, the selected minimum vector is determined as a prediction vector PMV (1804), and a difference between the minimum vector and its corresponding motion vector MV is computed to calculate a difference vector DMV (1805). On the other hand, if the evaluation value Cluster (BESTMV) is greater than the threshold, a prediction vector PMV is calculated by the conventional method such as H. 264 (1806), and a difference vector DMV is calculated (1807).

Figure 19:
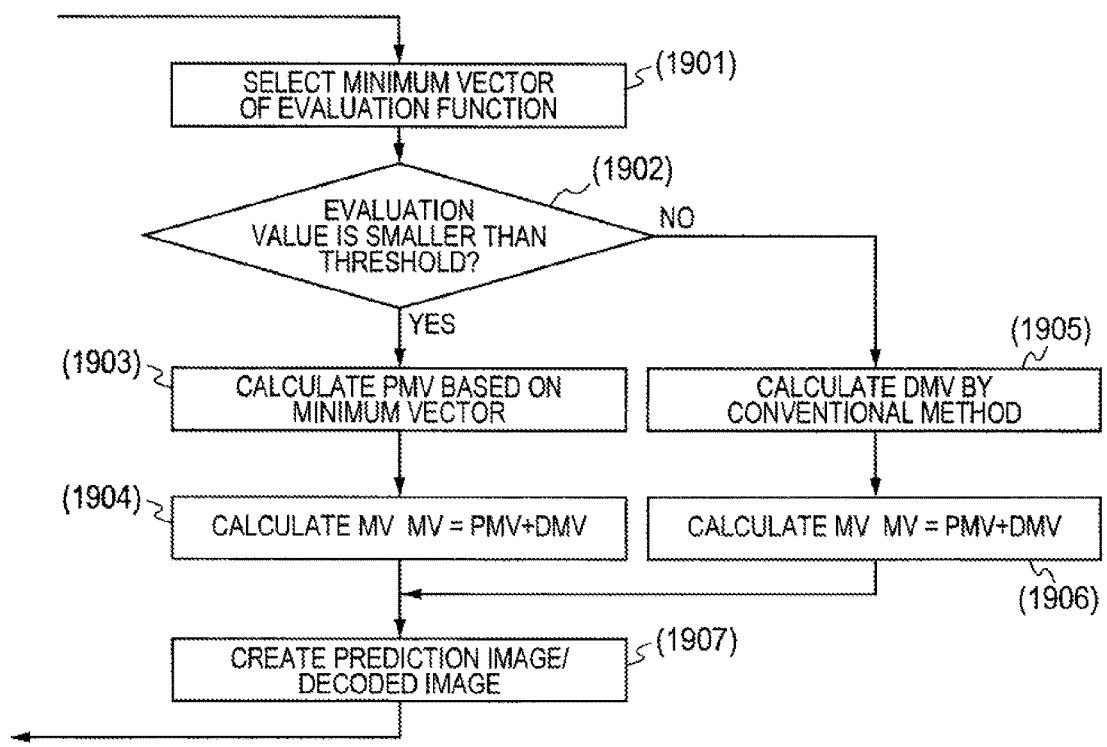
FIG. 19 is a flowchart of the image decoding method according to the present invention

FIG. 19 shows a procedure of decoding in the present embodiment. Only the inter prediction process (1315) shown in FIG. 13 is described herein. Since other operations are taken to carry out a procedure similar to FIG. 13, their description is omitted.

First, a vector is selected at which an evaluation value Cluster (MVx) indicative of similarity among motion vectors existing around a target block and further with peripheral motion vectors becomes minimum (1901). The evaluation value Cluster (BESTMV) and a threshold are compared with each other (1902). If the evaluation value Cluster (BESTMV) is smaller than the threshold, the selected minimum vector is determined as a prediction vector PMV (1903), and the sum of the prediction vector PMV and a difference vector DMV is calculated, thereby obtaining a motion vector MV (1904). On the other hand, if the evaluation value Cluster (BESTMV) is greater than the threshold, a prediction vector PMV is calculated by the conventional method such as H. 264 (1905), and thereby a motion vector MV is calculated (1906). Finally, a prediction image and a decoded image are generated using the calculated motion vectors (1907), whereby image decoding is carried out.

The present embodiment utilizes only the blocks lying within the same frame as the target block and at the periphery thereof. It is thus possible to obtain advantageous effects similar to those of the embodiments 1 through 3 with a small amount of coded bits.

INDUSTRIAL APPLICABILITY

The present invention is effective as a moving picture decoding technique for decoding a moving picture and a moving picture encoding technique for encoding a moving picture.

REFERENCE SIGNS LIST

101 through 115 . . . explanatory diagram of moving picture encoding device according to the present invention, 201 through 207 . . . explanatory diagram of moving picture encoding device according to the present invention, 301 through 308 . . . explanatory diagram of moving picture decoding device according to the present invention, 401 through 406 . . . explanatory diagram of moving picture decoding device according to the present invention, 501 through 505 . . . explanatory diagram of inter prediction encoding process by H. 264/AVC, 601 through 606 . . . explanatory diagram related to motion vector prediction technique by H. 264/AVC, 701 through 706 . . . explanatory diagram related to motion vector prediction technique by the present invention, 801 through 807 . . . explanatory diagram related to motion vector prediction technique by the present invention, 901 through 911 . . . explanatory diagram related to motion vector prediction technique by the present invention, 1001 through 1011 . . . explanatory diagram related to motion vector prediction technique by the present invention, 1101 through 1112 . . . explanatory diagram related to motion vector prediction technique by the present invention, 1201 through 1219 . . . blocks of flowchart, 1301 through 1314 . . . blocks of flowchart, 1401 through 1409 . . . blocks of flowchart, 1501 through 1509 . . . blocks of flowchart, 1601 through 1612 . . . blocks of flowchart, 1701 through 1712 . . . blocks of flowchart, 1801 through 1807 . . . blocks of flowchart, and 1901 through 1907 . . . blocks of flowchart.

The invention claimed is:

1. A moving picture decoding method comprising:
   a first step to receive encoded information of a target block to be decoded by an inter prediction process, the encoded information being encoded without a frequency transform process;
   a second step to decode prediction difference data of the target block from the encoded information without the frequency transform process;
   a third step to determine by which prediction mode the target block is encoded;
   a fourth step to generate a prediction image by the prediction mode determined by the third step, wherein if the target block is encoded by an intra prediction mode, a prediction image is generated by the intra prediction mode,
   wherein if the target block is encoded by a motion vector combined area mode, the prediction image is generated by using a motion vector determined so as to be in common with a motion vector of an adjacent block adjacent to the target block without adding a difference vector, based on a status of motion vectors of a plurality of adjacent blocks adjacent to the target block;
   and wherein a status of a motion vector of a previous frame is considered in the determination of the motion vector to be used for the generation of the prediction image in the fourth step, and
   a fifth step to generate a decoded image of the target block based on the prediction image generated in the fourth step and the prediction difference data decoded in the second step.

2. A moving picture decoding method comprising:
   a first step to receive encoded information of a target block to be decoded by an inter prediction process, the encoded information being encoded without a frequency transform process;
   a second step to decode prediction difference data of the target block from the encoded information without the frequency transform process;
   a third step to determine by which prediction mode the target block is encoded;
   a fourth step to generate a prediction image by the prediction mode determined by the third step, wherein if the target block is encoded by an intra prediction mode, a prediction image is generated by the intra prediction mode,
   wherein if the target block is encoded by a motion vector combined area mode, the prediction image is generated by using a motion vector determined so as to be in common with a motion vector of an adjacent block adjacent to the target block without adding a difference vector, based on a status of motion vectors of a plurality of adjacent blocks adjacent to the target block;
   and wherein a status of a motion vector of a previously decoded frame is considered in the determination of the motion vector to be used for the generation of the prediction image in the fourth step, and
   a fifth step to generate a decoded image of the target block based on the prediction image generated in the fourth step and the prediction difference data decoded in the second step.

\* \* \* \* \*